United States Patent
Rankin et al.

(10) Patent No.: US 11,055,166 B2
(45) Date of Patent: Jul. 6, 2021

(54) COVERTLY STORING A PAYLOAD OF DATA WITHIN A NETWORK

(71) Applicant: John Rankin, Williamsport, OH (US)

(72) Inventors: John Rankin, Williamsport, OH (US); Barry Boyer, Circleville, OH (US)

(73) Assignee: Rankin Labs, LLC, Williamsport, OH (US)

( * ) Notice: Subject to any disclaimer, the term of this patent is extended or adjusted under 35 U.S.C. 154(b) by 0 days.

(21) Appl. No.: 16/885,783

(22) Filed: May 28, 2020

(65) Prior Publication Data
US 2020/0379834 A1 Dec. 3, 2020

Related U.S. Application Data
(60) Provisional application No. 62/853,294, filed on May 28, 2019.

(51) Int. Cl.
*G06F 11/00* (2006.01)
*G06F 11/07* (2006.01)
*G06F 21/62* (2013.01)

(52) U.S. Cl.
CPC ...... *G06F 11/0772* (2013.01); *G06F 11/0709* (2013.01); *G06F 11/0751* (2013.01); *G06F 21/6263* (2013.01)

(58) Field of Classification Search
CPC ............. G06F 11/0709; G06F 11/0751; G06F 11/0772
See application file for complete search history.

(56) References Cited

U.S. PATENT DOCUMENTS

| | | | |
|---|---|---|---|
| 3,688,090 A | 8/1972 | Rankin | |
| 6,023,724 A | 2/2000 | Bhatia et al. | |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |
| 8,090,866 B1 | 1/2012 | Bashyam et al. | |
| 8,131,281 B1 * | 3/2012 | Hildner | H04L 41/0806 455/418 |
| 8,374,091 B2 | 2/2013 | Chiang | |
| 8,397,151 B2 | 3/2013 | Salgado et al. | |
| 8,730,966 B2 | 5/2014 | Awano | |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Charles Ehne
(74) *Attorney, Agent, or Firm* — Standley Law Group LLP

(57) ABSTRACT

Systems and methods for storing a covert payload of data within a network are provided. A datagram is generated at an origin host comprising the covert payload of data, a more fragments flag indicating that the datagram is part of a larger transmission, a source address for a confederate host, and a destination address for a blind host. The datagram is transmitted from the origin host to the blind host. When no further datagrams are received, the blind host sends an error message with the covert payload of data to the confederate host. This may be repeated across a number of blind and confederate hosts to form a ring.

19 Claims, 2 Drawing Sheets

SHORT TERM STORAGE ILLUSTRATION

(56) References Cited

U.S. PATENT DOCUMENTS

| | | | |
|---|---|---|---|
| 9,350,663 B2 | 5/2016 | Rankin | |
| 9,626,522 B1* | 4/2017 | Flowers, Jr. | .......... G06F 21/577 |
| 10,728,220 B2 | 7/2020 | Rankin | |
| 2001/0017844 A1 | 8/2001 | Mangin | |
| 2001/0019614 A1 | 9/2001 | Madoukh | |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2002/0164024 A1 | 11/2002 | Arakawa et al. | |
| 2003/0031198 A1 | 2/2003 | Currivan et al. | |
| 2003/0056009 A1 | 3/2003 | Mizrachi et al. | |
| 2005/0060538 A1 | 3/2005 | Beverly | |
| 2005/0105506 A1 | 5/2005 | Birdwell et al. | |
| 2005/0286517 A1 | 12/2005 | Babbar et al. | |
| 2006/0002681 A1 | 1/2006 | Spilo et al. | |
| 2006/0034317 A1 | 2/2006 | Hong et al. | |
| 2006/0133364 A1 | 6/2006 | Venkatsubra | |
| 2006/0259587 A1 | 11/2006 | Ackerman et al. | |
| 2007/0025388 A1 | 2/2007 | Abhishek et al. | |
| 2007/0028121 A1 | 2/2007 | Hsieh | |
| 2007/0223395 A1 | 9/2007 | Lee et al. | |
| 2007/0283125 A1 | 12/2007 | Manczak et al. | |
| 2008/0104313 A1 | 5/2008 | Chu | |
| 2009/0046717 A1 | 2/2009 | Li | |
| 2009/0110003 A1 | 4/2009 | Julien et al. | |
| 2010/0103830 A1 | 4/2010 | Salgado et al. | |
| 2011/0149891 A1 | 6/2011 | Ramakrishna | |
| 2011/0231630 A1 | 9/2011 | Dannowski et al. | |
| 2011/0238793 A1 | 9/2011 | Bedare et al. | |
| 2012/0117376 A1 | 5/2012 | Fink et al. | |
| 2012/0289250 A1 | 11/2012 | Fix et al. | |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |
| 2013/0091102 A1 | 4/2013 | Nayak | |
| 2014/0100014 A1 | 4/2014 | Bennett, III et al. | |
| 2014/0254598 A1 | 9/2014 | Jha et al. | |
| 2014/0294019 A1 | 10/2014 | Quan et al. | |
| 2015/0100613 A1 | 4/2015 | Osiecki et al. | |
| 2015/0229714 A1 | 8/2015 | Venkatsubra et al. | |
| 2016/0077976 A1 | 3/2016 | Raikin et al. | |
| 2016/0171399 A1 | 6/2016 | Santhanam et al. | |
| 2016/0269294 A1 | 9/2016 | Rankin | |
| 2017/0012951 A1* | 1/2017 | Mennes | ................ H04L 63/083 |
| 2017/0090872 A1 | 3/2017 | Mathew et al. | |
| 2018/0018147 A1 | 1/2018 | Sugawara | |
| 2018/0102975 A1 | 4/2018 | Rankin | |
| 2020/0204343 A1 | 6/2020 | Rankin | |
| 2020/0233668 A1 | 7/2020 | Rankin | |
| 2020/0236026 A1 | 7/2020 | Rankin | |
| 2020/0334168 A1 | 10/2020 | Rankin | |
| 2020/0358791 A1* | 11/2020 | Rankin | ............... H04L 63/0209 |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

Arkin, O., ICMP Usage in Scanning, Sys-Security Group, Jun. 2001.

Thyer, J., Covert Data Storage Channel Using IP Packet Headers, SANS Institute, Jan. 30, 2008.

\* cited by examiner

COVERTLY STORING A PAYLOAD OF DATA WITHIN A NETWORK

CROSS-REFERENCE TO RELATED APPLICATIONS

This application claims the benefit of U.S. Provisional Patent Application Ser. No. 62/853,294 filed May 28, 2019, the disclosures of which are hereby incorporated by reference as if fully restated herein.

TECHNICAL FIELD

Exemplary embodiments relate generally to systems and methods for covertly storing a payload of data within a network.

BACKGROUND AND SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use, and manage the Internet with the goal of improving its operations and efficiencies. These documents include protocol standards, best current practices, and information updates of various kinds, and are commonly referred to as Request for Comments (RFC).

TCP can be used to establish a bi-directional connection between two clients wherein activity begins with a request for information made by one client to another client. A "client" may be any program or application that initiates requests for, or sends information from, one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

The TCP protocol is typically implemented as a "daemon" that is part of a TCP/IP stack of protocol layers. A daemon— also often referred to interchangeably as a server or service—is generally a software component of a device that runs a background process. The term "daemon" may refer to a component of a networked device that sends (source daemon) or receives (destination daemon), and processes communications between remote clients according to the TCP standard.

A host is a device or system that runs or executes TCP/IP daemons. The term "host" may refer to any device or system including, but not limited to, a server platform, a personal computer (PC), and any other type of computer or peripheral device that implements and runs TCP software. Generally, a host physically connects and links clients and daemons to TCP/IP networks, thereby enabling communication between clients.

TCP software accepts requests and data streams directly from clients and other daemons, sequentially numbering the bytes, or octets, in the stream during the time the connection is active. When required, the TCP software breaks the data stream into smaller pieces called segments (sometimes referred to as datagrams, fragments, or packets generally) for transmission to a requesting client. The protocol calls for the use of checksums, sequence numbers, timestamps, timeout counters and retransmission algorithms to ensure reliable data transmission.

The IP layer actually performs the communication function between two networked hosts. The IP software receives data segments from the TCP layer, ensures that the segment is sized properly to meet the requirements of the transmission path and physical adapters (such as Ethernets and CTCs). The IP software changes the segment size, if necessary, by breaking the segment down into smaller IP datagrams, and transmits the data to the physical network interface or layer of the host.

The network connecting devices are often called gateways. These gateways communicate between themselves for control purposes. Occasionally, a gateway or destination host will communicate with a source host, for example, to report an error in datagram processing. For such purposes the Internet Control Message Protocol (ICMP) is used.

The protocols that make up and control an IP Network are strictly adhered to in order to maintain proper functionality of the network. A minimum of responsible and effective implementation is expected from any given host implementation. While layers of Internet protocols may be designed for error recovery and effective communication, it is possible to utilize these same designs for alternative means without requiring alterations.

The IP protocol RFC 791 provides for the concept of datagram fragmentation. A fully formed datagram that has a length which exceeds the transmission requirements of the network must be broken into smaller pieces at the source and reassembled at the final destination. This is generally accomplished through the use of the More Fragments (MF) flag in the IP header, combined with the Fragment Offset value. The receiving host must collect all pieces of the fragmented datagram, reassemble them into the proper sequence, and ensure that the complete datagram has been produced before passing the datagram onto the rest of the protocol stack for processing.

If reassembly is not completed within a predetermined period of time, the first fragment will generate an error message (for example, an ICMP error message described more fully in RFC 792), that will be returned to the originating host. This error message may contain an explanation of the error, in this case a timeout, a copy of the original IP header, and often the first 64 bits or other amount of the data payload. Generally, only the first fragmented piece of the datagram will generate an error as all other resources are generally discarded during error recovery.

These types of standardized behavior patterns are necessary for the dependable operation of a network. It is these dependable and regimented responses that may be utilized to trigger actions that are unexpected.

For a number of reasons, it may be desirable to covertly store a payload of data within a network. The present disclosures provide systems and processes where a payload of information may be stored within a network using a blind host as the storage location. The blind host may be kept unaware of its temporary involvement and no indication of the origin of the data may be provided or made available. This storage may be utilized with a ring of confederate hosts, thereby extending the storage of data from short term to an essentially indefinite length without revealing the existence of the data, nor the origin of its creation.

These systems and methods may utilize the blind host's requirement to produce error messages, such as but not limited to an ICMP message, when the blind host fails to reassemble a fragmented datagram. The origin host may create a datagram comprising a payload of information that is destined to be sent to a confederate host. However, the origin host may direct the traffic to the blind host, who may store the datagram for a period of time while waiting for the rest of the datagram to arrive. After a timeout period, the blind host may construct the error message, such as but not limited to an ICMP error message, which may contain the payload, and transmit the error message to the confederate host. The confederate host may repeat the same or similar operation, and may restore the payload in a second blind host on the way to other confederate hosts in a ring of confederates.

By using this blind bounce back technique, it is possible to covertly store a payload of data in a network of blind hosts, which may be sustained by a ring of confederate hosts. In this way, the payload may be covertly secured with an unaware blind host such that the existence or origin of the payload may not be revealed at any point within the confederate ring.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
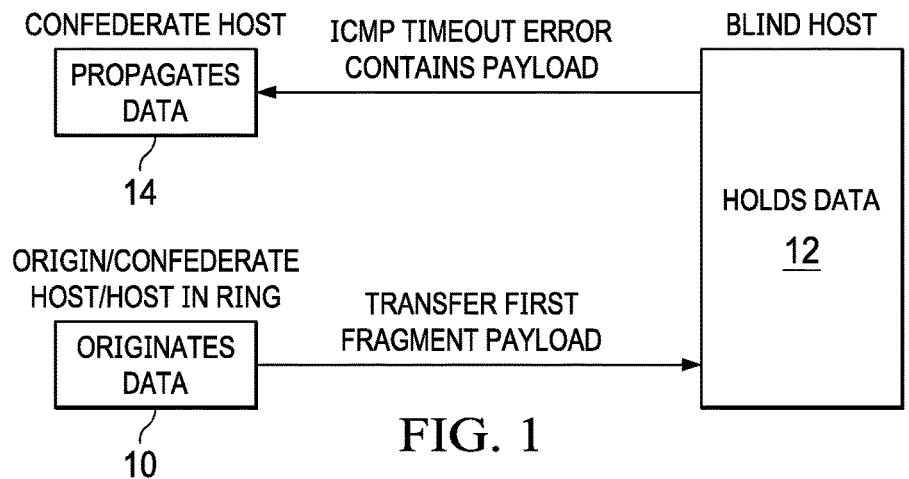
FIG. 1 is a simplified block diagram of an exemplary short-term storage solution.

FIG. 1 is a simplified block diagram of an exemplary short-term storage solution. An origin host 10 may comprise a host machine on a network. The network may be any type of network, or combination of networks, such as but not limited to, an IP network. The network may comprise the world wide web, an internet, an intranet, cellular network, some combination thereof, or the like. The host machines may comprise personal computers, tablets, smartphones, servers, some combination thereof, or the like. The origin host 10 may operate, at a minimum, simply as a host and does not necessarily need to operate as a gateway, though such is possible and considered to be within the scope of the present disclosures. The origin host 10 may originate the data for covert storage which is transmitted to a confederate host 14, though the data may be uploaded or otherwise transferred to the origin host 10. The confederate host 14 may be configured to store the data in a covert manner such that the data is practically, or entirely, undetectable. The origin host 10 may, alternatively or additionally, be configured to store the data in a covert manner which is practically, or entirely, undetectable. The confederate host 14 may be configured to remain substantially undetected and may be configured to initiate the covert long- or short-term storage of the data as further described herein. Any length of storage may be utilized.

Figure 2:
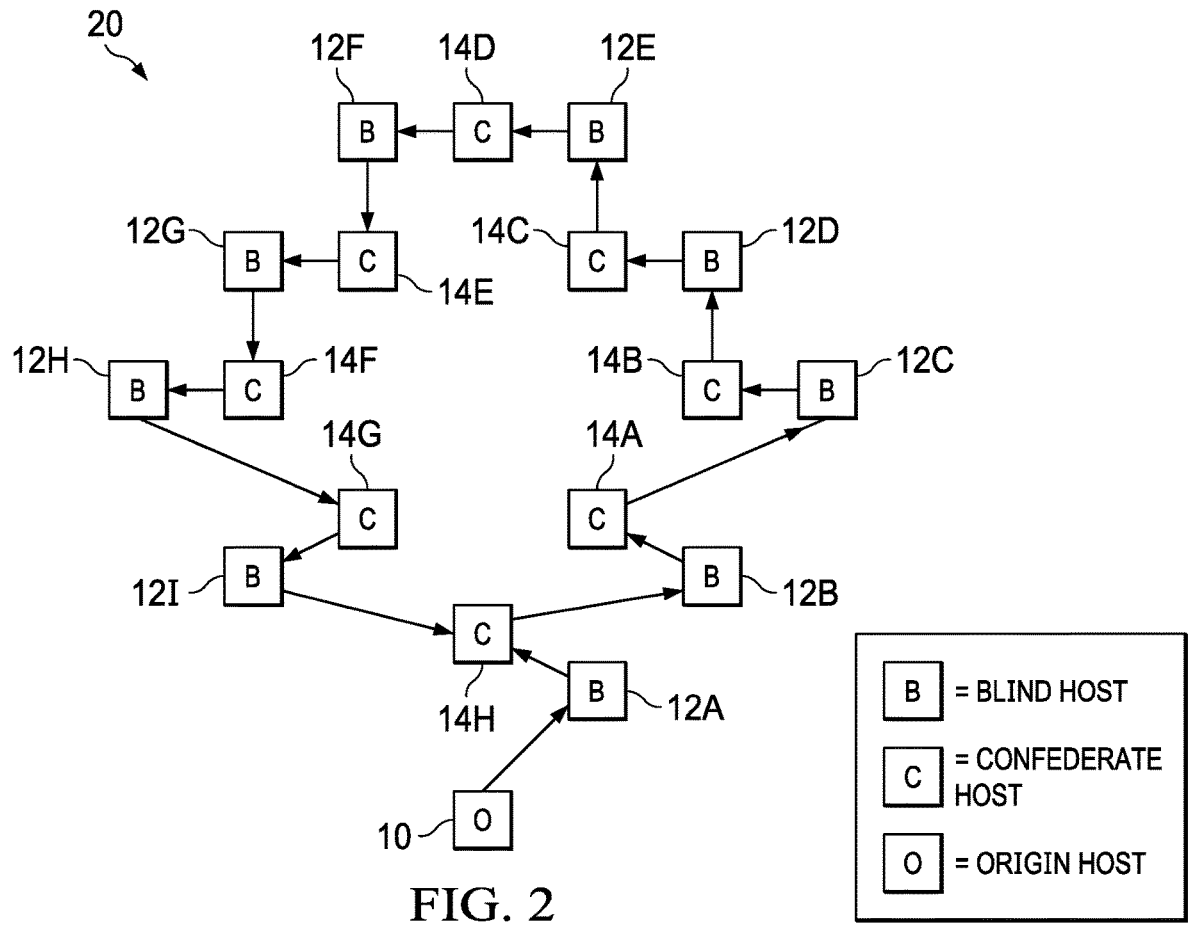
FIG. 2 is a simplified block diagram of an exemplary long-term storage ring.

FIG. 2 is a simplified block diagram of an exemplary long-term storage ring. The confederate host 14 may be a host machine on the network. The confederate host 14 may operate, at a minimum, simply as a host and does not necessarily operate as a gateway, though such is possible and considered to be within the scope of the present disclosures. The confederate host 14 may be a machine which is part of a ring of hosts 20. The confederate host 14 may periodically be the recipient of data intended for covert storage. The confederate host 14 may be configured to propagate the covert data to another confederate host 14A-14H within the ring of hosts 20. At no point does any confederate host 14A-14H have information about the origin of the covert data or any other confederate host 14A-14H, with the exception of the next host in the ring 20. However, because the origin of the covert information that is received by the next host is undetectable, the confederate host 14A-14G only knows where to send the covert information for continued long-term storage, and not from where it originated, thus preserving the covert nature of the data.

The blind host 12 may be a host machine on the network. The blind host 12 may operate as a correctly implemented IP host. The blind host 12 may conform to both RFC 791 and RFC 792, for example without limitation. Furthermore, the blind host 12 may have, or create, a transmission path to both the next confederate host 14A-14H in the ring 20 as well as the origin host 10. Each confederate host 14A-14H may have, or create, a transmission path to the next blind host 12A-12I to complete the ring 20. These transmission paths do not need to be on the same electrical and/or wireless path, but must be reachable for purposes of local or connected gateway operations. The blind host 12 does not need to have previous knowledge of the other hosts 10, 12A-12I, and 14A-14H or any further interactions after the covert information has been sent to the next confederate host 14A-14H.

Figure 3:
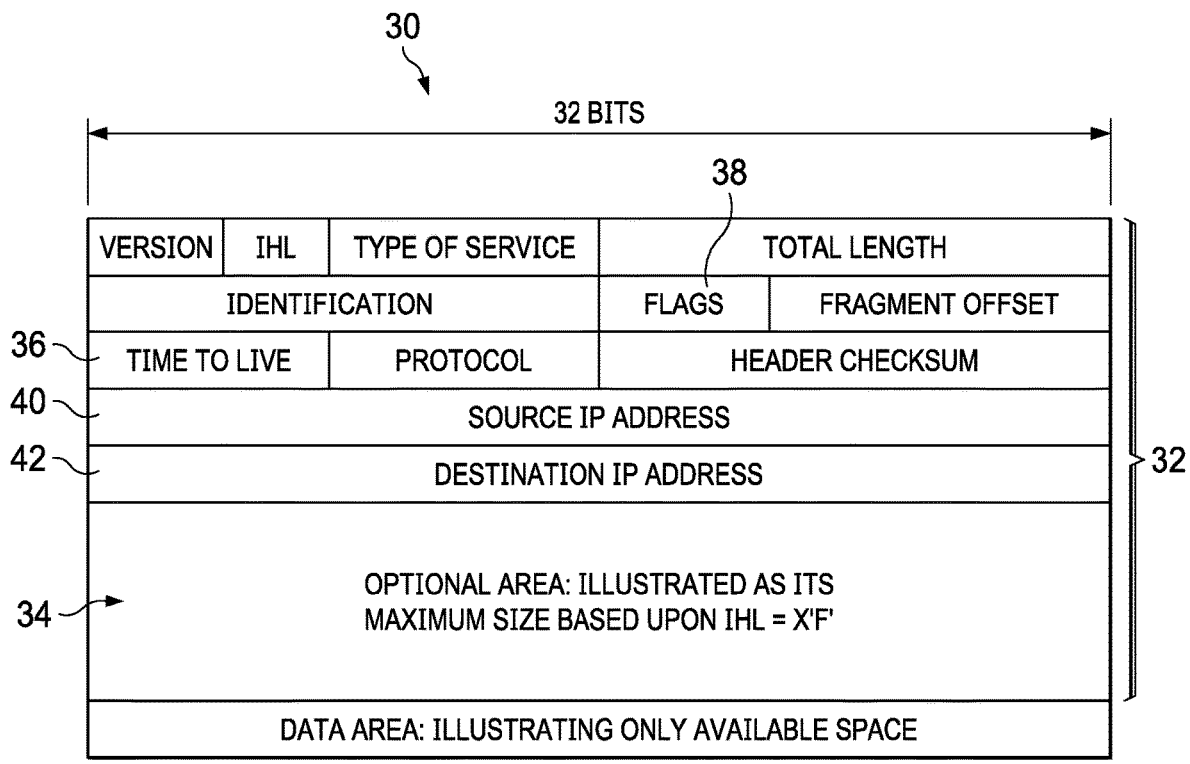
FIG. 3 is a simplified block diagram of an exemplary datagram fragment.
Figure 4:
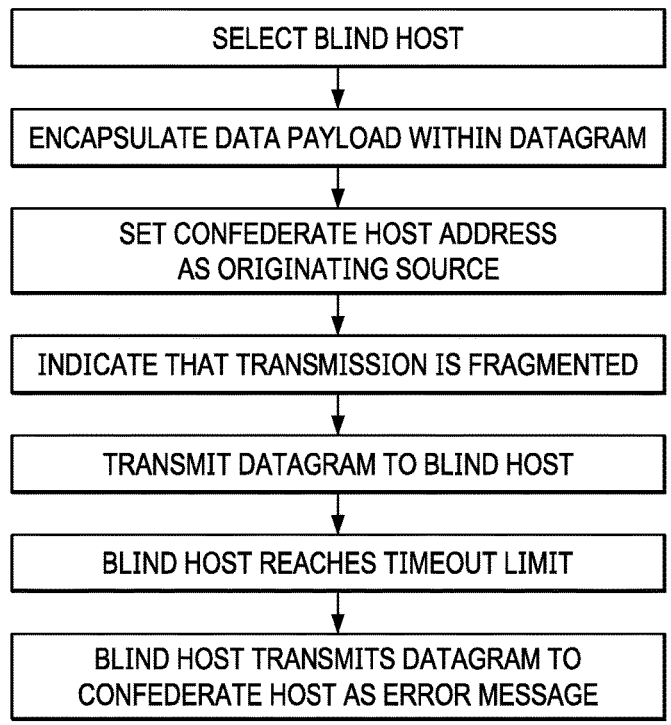
FIG. 4 is a flow chart with exemplary logic for covertly storing the payload of data within a network.

FIG. 3 is a simplified block diagram of an exemplary datagram fragment 30 and FIG. 4 is a flow chart with exemplary logic for use with the IP datagram fragment 30. There are several specific system configurations which may be provided, though are not necessarily required, to achieve storage of covert information. Alternatively, or additionally, there are several specific steps that may be performed, though are not necessarily required, to achieve storage of covert information. Several exemplary system attributes and/or process steps are provided below. However, such attributes and/or steps are exemplary and are not intended to be exclusive. Furthermore, such steps may be repeated or performed in any order.

1. A blind host 12 may be selected which implements the network layer protocol. In exemplary embodiments, the network is an IP network and the network layer protocols are defined by at least RFC 791, and the ICMP protocol, preferably, as defined by at least RFC 792.

2. The blind host 12 may be reachable from the origin host 10 of the covert information for storage or from a propagator of that information.

3. The covert information may be encapsulated within a datagram fragment 30 such as, but not limited to, the datagram format of FIG. 3. The datagram fragment 30 may be formatted, at least in part, as described in RFC 791, though such is not required. The covert payload may be limited in size and location. The covert payload may be wholly contained within the header 32 or within the optional area 34 that immediately follows the header 32 of the datagram fragment 30. While the operational area 34 might initially seem a rather restrictively small amount of payload, there is ample room within the optional area 34 of the header itself 32. An exemplary maximum amount of payload area is illustrated in FIG. 3, though any size and format datagram fragment 30 may be utilized. For example, without limitation, with the full optional area 34 and 64 bits following the header 32, a total payload of 12 full words, or 48 bytes, may be available for the covert payload. The datagram fragment 30 may be formatted for use on an IP network, though formatting for other types and protocols may be utilized.

4. The originating or propagating host 10 may be configured to construct a header 32 for the datagram fragment 30 to contain the covert information. This header 32 may be configured to trigger predetermined events based on certain communication protocols, system rules, and the like, such as but not limited to, the mechanisms of RFC 791 and RFC 792. The header 32 may be constructed to force the blind host 12A-12I, who is designed to follow certain protocol rules, into operating in a way that, unknown to the blind host 12A-12I, facilitates the covert storage of the payload. In this way, the blind host 12A-12I may become an unknown, and potentially unwilling, participant in the operation. Furthermore, the disclosed systems and processes may provide the ability to store covert information within the network without revealing the storage existence or the origin of the covert data if the covert data is somehow discovered.

The following additional system configurations and/or steps may be adhered to in exemplary embodiments. Several additional exemplary system attributes and/or process steps are provided below, though are not necessarily required. However, such additional attributes and/or steps are exemplary and are not intended to be exclusive or otherwise limiting. Furthermore, such additional steps may be repeated or performed in any order.

A. The source address 40 of the datagram 30 may identify the address of the next confederate host 14A-14H in the ring 20. The addresses may be IP addresses, though other identifiers may be utilized alternatively or in addition. When the believed to exist additional fragments of the full datagram (those indicated by the datagram 30 to be coming) never arrive, the blind host 12A-12I may be forced by protocol rules to send an error message. That error message may be directed to the source address 40—i.e., the next confederate host 14A-14H in the ring 20. In this way, the blind host 12A-12I may receive a transmission that the blind host 12A-12I will eventually determine is in error. Following the ICMP rules, or other preconfigured protocol rules, the blind host 12A-12I may generate and send an error message back to the host the blind host 12A-12I believes created the error in the first place. However, because the confederate host's 14A-14H address is contained in the source address field 40 of the received datagram 30, the blind host 12A-12I, following protocol, may assume that the confederate host 14A-14H is the originator of received transmission and may report this detected error to that address, thereby unwittingly delivering the covert information to the next confederate host 14A-14H in the ring 20 as the covert information will be contained within the transmission determined by the blind host 12A-12I to be erroneous.

B. The destination address 42 may identify the address of the next blind host 12A-12I in the ring 20. In this way, the protocol functions may be utilized in a way which operates to achieve the objective of covert storage. The origin host 10, or another propagating confederate host 14A-14H, may utilize the blind host 12A-12I as an unwitting storage location for short-term storage of the covert information. This may be accomplished by transmitting a fragment 30 purported to be part of a larger datagram. Since this fragment 30 is directed at the blind host 12A-12I, the blind host 12A-12I may store the fragment 30 as the blind host 12A-12I waits to receive all the purported additional fragments of the datagram for reassembly and processing because it may not be possible for the blind host 12A-12I to process the fragment 30 until the complete datagram has been received and reconstructed. Only when the full datagram is complete may the blind host 12A-12I be able to examine the datagram for distribution and action. However, since the blind host 12A-12I may only receive the first fragment 30 of the purported datagram, the blind host 12A-12I may store the fragment 30 until the timeout period is reached. Once a fragmentation timeout period is reached or exceeded, the blind host 12A-12I may be configured to construct an error message containing the covert information from the fragment 30 and transmit the fragment 30 with the covert information to the believed-to-be source of the fragment 30—i.e., the next confederate host 14A-14H in the ring 20. The blind host 12A-12I may be configured to discard the unused fragment 30 as an erroneous or incomplete transmission.

C. The more fragments (MF) message may be indicated in the flags 38 section of the header 32 of the fragment 30 by the originating host 10. The MF message may engage the fragmentation routines of the blind host 12A-12I, as described herein. For example, without limitation, the MF message may cause the blind host 12A-12I to store the datagram fragment 30 as it awaits the purported arrival of additional fragments, and when those fragments never arrive, may trigger the blind host 12A-12I, according to protocol, to send a copy of the fragment 30 to the source address 40 (i.e., the next confederate host 14A-14H), and delete its copy of the fragment 30.

D. The time to live field 36 of the header 32 of the fragment 30 may be an important control over the length of the storage of the covert information. This field may be decremented by one for every transition the datagram fragment 30 makes through gateways, though such is not required. However, once the fragment 30 arrives at the blind host 12A-12I, the protocol functions may control the fragment's 30 use and operation. For example, without limitation, the blind host 12A-12I may be configured to follow RFC 791, which provides that "if the timer runs out, then all the reassembly resources for the buffer identifier are released. [An ICMP error message regarding the condition of the timer occurrence is sent to the confederate host.] The initial setting of the timer is a lower bound on the reassembly waiting time. This is because the waiting time will be increased if the Time to Live in the arriving fragment is greater than the current timer value but will not be decreased if it is less. The maximum this timer value could reach is the maximum Time to Live (approximately 4.25 minutes)." However, other protocols or system rules may be utilized.

The short-term solution illustrated in FIG. 1 demonstrates how covert information may be stored for a length of time controlled by the time to live 36 value provided in the fragment 30. Such storage may occur within a blind host 12A-12I which is unaware of the storage operation or the origin of the information. Because the blind host 12A-12I is only aware of the address of the confederate host 14A-14H as indicated in the source address field 40 of the datagram 30, it is possible to create the ring of hosts 20. An exemplary ring 20 is illustrated in FIG. 2. As long as any given confederate host 14A-14H is only aware of the next confederate host 14A-14H in the ring 20, it is possible to covertly transfer information indefinitely around the ring 20 through the use of a series of unsuspecting blind hosts 12A-12I and confederate hosts 14A-14H. In this way, storage of the covert payload may be continued for any length of time. Each blind host 12A-12I in the ring 20 is unaware of their storage and involvement and is also only aware of the next confederate host 14A-14H to transfer the fragment 30 to and not the originating host 10 of the fragment 30 comprising the covert data.

The use of a series of blind hosts 12A-12I renders detection practically impossible because the unwitting blind hosts 12A-12I may also be randomly selected and may be changed for every point in the ring 20. Furthermore, the blind hosts 12A-12I and confederate hosts 14A-14H may be periodically changed. The fragment 30, in exemplary embodiments, is never stored within a confederate host 14A-14H as the confederate hosts 14A-14H are only used to propagate the fragment 30 with the covert data forward and remain unaware of any other confederate hosts 14A-14H except for next confederate host 14A-14H in the ring 20. Since the communication between these two confederate hosts 14A-14H is done through the use of the blind host 12A-12I, knowledge of the source and dimensions of the total ring 20 are not available.

While a certain number of blind hosts 12A-12I and confederate hosts 14A-14H are shown and described herein, any number of blind hosts 12A-12I and confederate hosts 14A-14H may be utilized to form any size ring 20 or other communication pathway. Furthermore, the blind hosts 12A-12I and confederate hosts 14A-14H may be periodically changed or substituted such that the ring 20 is periodically changed in composition, size, and/or configuration. While a ring 20 is described, any linkage pathway of hosts 10, 12A-12I, and 14A-14H may be utilized. The ring 20 may change size, shape, and number of participants over time. Furthermore, the blind host 10 may also serve as a confederate host 14A-H.

While some aspects of the present disclosures are provided with respect to current internet protocols and standards, such is merely exemplary and is not intended to be limiting. The concepts described herein may be adapted for use with a variety of internet protocols, communications standards, system rules, and the like, whether currently known or developed in the future.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose or specialized computing devices. The electronic devices may be personal computers, smartphones, tablets, databases, servers, or the like. The electronic connections described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A method for storing a covert payload of data within an IP network, said method comprising the steps of:

generating, at an origin host, an IP datagram fragment comprising the covert payload of data, a more fragments flag, a source IP address set for a first confederate host, and a destination IP address set for a first blind host;

transmitting the IP datagram fragment from the origin host to the first blind host as one part of a larger datagram;

sending no more parts of the larger datagram;

producing, at the first blind host, an error message concerning a fragmentation timeout;

encapsulating, at the first blind host, the covert payload of data within the error message;

transmitting, from the first blind host, the error message to the first confederate host;

receiving, at the first confederate host, the error message from the first blind host comprising the covert payload of data; and unpacking, at the first confederate host, the covert payload of data from the error message.

2. The method of claim 1 further comprising:
a number of additional blind hosts;
a number of additional confederate hosts; and
an established transmission path connecting the first blind host, the number of additional blind hosts, the first confederate host, and the number of additional confederate hosts in a ring.

3. The method of claim 1 wherein:
the first blind host implements protocols complying with RFC 791 and RFC 792.

4. The method of claim 1 wherein:
the covert payload of data is encapsulated within the IP header or the optional area following the IP header of an IP datagram.

5. The method of claim 1 further comprising the steps of:
specifying, at the origin host and for the IP datagram fragment, a time to live value in the IP header, wherein the time to live value indicates a length of time desired for temporary storage.

6. The method of claim 1 wherein:
the error message comprises an ICMP error message.

7. A method for storing a covert payload of data within a network, said method comprising the steps of:
generating, at an origin host, a datagram comprising the covert payload of data, a more fragments flag indicating that the datagram is part of a larger transmission, a source address for a confederate host, and a destination address for a blind host;
transmitting, from the origin host to the blind host, the datagram;
receiving, at the blind host, the datagram;
storing, at the blind host, the datagram for an amount of time indicated at a time to live value provided at the datagram;
determining, at the blind host, that no additional datagram fragments have arrived within the amount of time; and
transmitting, from the blind host to the confederate host, an error message comprising the datagram.

8. The method of claim 7 further comprising the steps of:
receiving, at the confederate host, the error message comprising the datagram;
constructing, at the confederate host, a second datagram comprising the covert payload of data, the more fragments flag indicating that the second datagram is part of a larger transmission, a source address for a second confederate host, and a destination address for a second blind host;
transmitting, from the confederate host to the second blind host, the second datagram;
receiving, at the second blind host, the second datagram;
storing, at the second blind host, the second datagram for the amount of time;
determining, at the second blind host, that no additional datagram fragments have arrived within the amount of time; and
transmitting, from the second blind host to the second confederate host, a second error message comprising the second datagram.

9. The method of claim 8 further comprising the steps of:
receiving, at the second confederate host, the second error message comprising the second datagram;
constructing, at the second confederate host, a third datagram comprising the covert payload of data, the more fragments flag indicating that the third datagram is part of a larger transmission, a source address for the first confederate host, and a destination address for a third blind host;
transmitting, from the second confederate host to the third blind host, the third datagram to create a ring.

10. The method of claim 7 wherein:
the network is an IP network;
the source address comprises an IP network address for the first confederate host; and
the destination address comprises an IP network address for the first blind host.

11. The method of claim 10 wherein:
the blind host is configured to operate in accordance with RFC 791; and
the error message is generated in accordance with RFC 792.

12. The method of claim 7 wherein:
the covert payload of data is stored at a header of the datagram.

13. The method of claim 7 wherein:
the origin host, the blind host, and the confederate host each comprise a server located on an IP network.

14. A system for storing a covert payload of data within a network comprising:
a confederate host;
a blind host;
an origin host comprising software instructions stored at one or more electronic storage devices, which when executed, configure one or more processors to:
generate a datagram fragment comprising the covert payload of data, a more fragments flag indicating that the datagram fragment is part of a larger transmission, a source address for the confederate host, a destination address for the blind host, and a time to live value specifying an amount of time; and
transmit the generated datagram to the blind host;
wherein the blind host comprises software instructions stored at one or more electronic storage devices, which when executed, configure one or more processors to:
receive the datagram fragment;
wait the amount of time for additional datagram fragments to arrive;
determine that no additional datagram fragments have arrived during the amount of time;
generate an error message comprising the convert payload of data; and
transmit the error message to the confederate host.

15. The system of claim 14 further comprising:
a number of additional blind hosts;
a number of additional confederate hosts, each comprising software instructions stored at one or more electronic storage devices, which when executed, configure one or more processors to:
generate an additional datagram fragment comprising the covert payload of data, the more fragments flag indicating that the additional datagram fragment is part of a larger transmission, a source address for a next one of the number of additional confederate hosts, a destination address for a next one of the number of additional blind hosts, and a time to live value specific to the amount of time; and
transmit the generated additional datagram to the next one of the number of additional blind hosts.

16. The system of claim 15 wherein:
a last one of the number of additional confederate hosts is configured to set the source address to the confederate host such that a ring is formed for continuous storage of the covert payload of data.

17. The system of claim 15 wherein:

a last one of the number of additional confederate hosts is configured to set the source address to the origin host such that a ring is formed for continuous storage of the covert payload of data.

18. The system of claim 15 wherein:

the network is an IP network; and the blind host is configured to adhere to RFC 791 and 792 protocols.

19. The system of claim 18 wherein:

the origin host and the confederate host each comprise personal computers; and the blind host comprises a server.

* * * * *